United States Patent
Rosenbaum et al.

(10) Patent No.: US 7,373,389 B2
(45) Date of Patent: May 13, 2008

(54) PERIODIC UPDATE OF DATA IN A RELATIONSHIP SYSTEM

(75) Inventors: Andrew Michael Rosenbaum, San Jose, CA (US); Joy Shau-Yee Su, Cupertino, CA (US); Mark Francis Interrante, Redwood City, CA (US); Gary Michael Sawka, Jr., Los Altos Hills, CA (US)

(73) Assignee: Spoke Software, San Mateo, CA (US)

( * ) Notice: Subject to any disclaimer, the term of this patent is extended or adjusted under 35 U.S.C. 154(b) by 241 days.

(21) Appl. No.: 10/914,857

(22) Filed: Aug. 9, 2004

(65) Prior Publication Data
US 2006/0031203 A1 Feb. 9, 2006

Related U.S. Application Data

(60) Provisional application No. 60/498,466, filed on Aug. 27, 2003.

(51) Int. Cl.
*G06F 15/16* (2006.01)
*G06F 3/048* (2006.01)

(52) U.S. Cl. ...................................... 709/207; 715/853
(58) Field of Classification Search ................ 709/204, 709/205, 206, 225, 201; 707/3–5; 715/835, 715/853
See application file for complete search history.

(56) References Cited

U.S. PATENT DOCUMENTS

| 5,402,474 | A | | 3/1995 | Miller et al. |
| 5,745,113 | A | * | 4/1998 | Jordan et al. ............... 715/835 |
| 5,892,909 | A | | 4/1999 | Grasso et al. |
| 6,073,138 | A | | 6/2000 | de l'Etraz |
| 6,175,831 | B1 | | 1/2001 | Weinreich et al. |
| 6,338,065 | B1 | | 1/2002 | Takahashi et al. |
| 6,594,673 | B1 | | 7/2003 | Smith et al. |
| 6,647,384 | B2 | | 11/2003 | Gilmour |
| 6,801,200 | B1 | | 10/2004 | Prakriya et al. |
| 6,879,985 | B2 | | 4/2005 | Deguchi et al. |
| 7,024,404 | B1 | | 4/2006 | Gerasoulis et al. |
| 7,039,639 | B2 | | 5/2006 | Brezin et al. |
| 7,069,308 | B2 | * | 6/2006 | Abrams ...................... 709/218 |
| 2001/0054032 | A1 | | 12/2001 | Goldman et al. |
| 2002/0012011 | A1 | | 1/2002 | Roytman et al. |
| 2002/0059201 | A1 | | 5/2002 | Work |
| 2002/0091667 | A1 | | 7/2002 | Jaipuria et al. |

(Continued)

OTHER PUBLICATIONS

Foner, Leonard, "Yenta: a multi-agent, referral-based matchmaking system," Proceedings of the first international conference on Autonomous agents, Year of Publication 1997, pp. 301-307.

Kleinberg, Jon, "The small-world phenomenon: an algorithm perspective," Proceedings of the thirty-second annual ACM symposium on Theory of computing, Portland, Oregon, United States, Year of Publication 2000, pp. 163-170.

(Continued)

*Primary Examiner*—Paul H. Kang
(74) *Attorney, Agent, or Firm*—Blakely, Sokoloff, Taylor & Zafman LLP (57) ABSTRACT

A method and system for periodically updating data in a relationship system are disclosed. In one embodiment, the method includes identifying a set of desired data concerning elements of a relationship graph. The elements of the relationship graph include nodes representing entities and edges representing relationships between entities. The method further includes determining which pieces of the desired data are important to users and finding one or more information suppliers for each important piece of the desired data.

30 Claims, 9 Drawing Sheets

U.S. PATENT DOCUMENTS

| | | |
|---|---|---|
| 2002/0107859 A1 | 8/2002 | Tsuyuki |
| 2002/0156875 A1 | 10/2002 | Pabla |
| 2002/0171687 A1 | 11/2002 | Li et al. |
| 2002/0194256 A1* | 12/2002 | Needham et al. ............ 709/201 |
| 2003/0093482 A1 | 5/2003 | Watanabe |
| 2003/0158855 A1 | 8/2003 | Farnham et al. |
| 2003/0167324 A1 | 9/2003 | Farnham et al. |
| 2004/0148275 A1* | 7/2004 | Achlioptas ..................... 707/3 |
| 2004/0261030 A1 | 12/2004 | Nazzal |
| 2005/0021531 A1 | 1/2005 | Wen et al. |
| 2005/0021750 A1* | 1/2005 | Abrams ..................... 709/225 |
| 2005/0038533 A1 | 2/2005 | Farrell et al. |
| 2007/0106780 A1 | 5/2007 | Farnham et al. |

OTHER PUBLICATIONS

Kubota, et al., "Exchanging tacit community knowledge by talking-virtualized-egos," Proceeding of the fourth international conference on Autonomous agents, Barcelona, Spain, Year of Publication 2000, pp. 285-292.

Adamic, Lada, A., et al., "Search in power-law networks," Physical Review E, vol. 64, 046135, published Sep. 26, 2001, (8 pages).

Yao, Beiqing, et al., "Absorptive Capacity and Social Network: Internal Ability and External Opportunity for Product Innovation," ICMIT2000, 0-7803-6652-2/2000/$10.00 © 2000 IEEE, pp. 708-714.

Johnston, David A., et al. "Social Networks and the Implementation of Environmental Technology," IEEE Transactions on Engineering Management, vol. 47, No. 4, Nov. 2000, 0018-9391/00$10.00 © 2000 IEEE, pp. 465-477.

Johnston, David A., et al. "Social Network and the Implementation of Environment Technology," Nov. 2000, IEEE, vol. 2, Issue 4, pp. 465-4777.

Yao, Beiqing, et al., Absorptive Capacity and Social Network: Internal Ability and External Opportunity for Product Innovation, Nov. 12-15, 2000, IEEE vol. 2, pp. 708-714.

* cited by examiner

PERIODIC UPDATE OF DATA IN A RELATIONSHIP SYSTEM

RELATED APPLICATIONS

This application is related to and claims the benefit of U.S. Provisional Application No. 60/498,466 filed on Aug. 27, 2003, which is hereby incorporated by reference.

FIELD OF THE INVENTION

This invention relates generally to relationships systems, and more particularly to periodic update of data in a relationship system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, Spoke Software, Inc., All Rights Reserved.

BACKGROUND OF THE INVENTION

Currently various computer-based applications manage and track interactions between people in conjunction with, for example, a sales process. Customer Relationship Management (CRM) systems that incorporate sales force automation methodologies typically focus on pipeline management and on monitoring the sales process between known endpoints but the current CRM systems cannot identify a new endpoint or provide a guided process to a new endpoint.

Social Network Theory has evolved to characterize the behavior of "referral networks." Researchers have described mathematically the multiple levels of relationships existing among networks of people, for example, the situation where two friends, Jim and Fred, may see each other every day at the gym (high personal relationship strength) but never discuss business (low professional relationship strength). Further, social network theorists have shown that networks exhibit predictable behaviors at the macro and micro levels. As the networks grow, they tend to preferentially attach to the more connected nodes, with the "rich getting richer".

Bridges between networks (particularly between highly connected nodes) that span enterprises are important for sales prospecting purposes. Studies of connections among these networks demonstrated what might appear to be counter-intuitive: when it comes to finding a job, our "weak social links" are more important than the more cherished, strong, relationships, indicating that groups of tightly coupled friendship circles connect to other groups of tightly coupled friendships via "bridges" that sharply broaden the job search space.

Although Social Network Theory has established that evaluating a person's social network can generate high quality contacts, analysis of social relationship information to identify and quantify referral routes to a desired person or company has not been incorporated into computer-based applications. In particular, the identification of "invisible" referral routes has not been addressed, e.g., Fred went to school with the Vice President of Purchasing at a particular company Jim has as a sales target.

SUMMARY OF THE INVENTION

A method and system for periodically updating data in a relationship system are disclosed. According to one aspect of the invention, the method includes identifying a set of desired data concerning elements of a relationship graph. The elements of the relationship graph include nodes representing entities and edges representing relationships between entities. The method further includes determining which pieces of the desired data are important to users and finding one or more information suppliers for each important piece of the desired data.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

An overview of the operation of an embodiment of an entity relationship analysis and mapping system is described with reference to FIG. 1A. The system utilizes social network models to build graphs that represent relationships among entities. For sake of simplicity in description, an entity is generally assumed herein to be an individual, but an entity may also be an organization of people, e.g., a company, or collection of characteristics shared by people, e.g., culture or country. Furthermore, the operations described herein may be requested or invoked by other system services, such as applications and computerized agents, as well as entities.

Figure 1A:
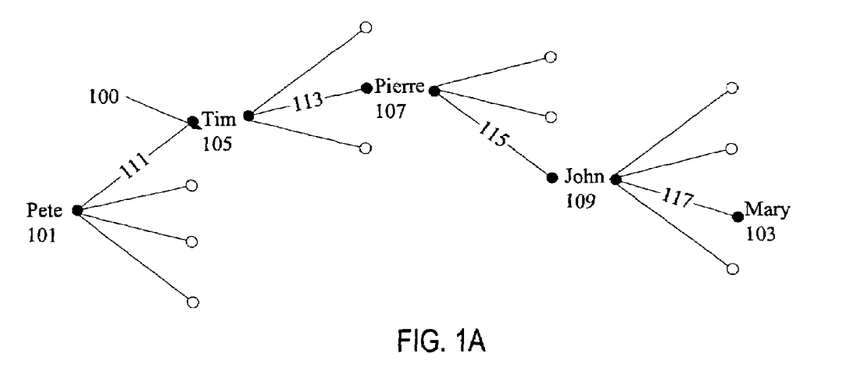
FIG. 1A is a diagram illustrating an operational overview of an embodiment of the invention.

As illustrated in FIG. 1A, relationships among five people form a relationship graph 100 containing nodes 101, 103, 105, 107, 109, representing the people, that are connected by edges 111, 113, 115, 117, representing the relationships among the people. The relationship graph 100 is built from contact data extracted from electronic communication data sources and updated when the source data changes or as a result of processing of the data in the graph. The data source may be an electronic document, such as an address book or an attachment to a message, and/or electronic communication metadata, such as email address headers, instant message logs, phone logs, or the like. It will be appreciated that when the entities represent organization or characteristic collections, additional electronic data sources, such as organization charts, may be used to create the nodes.

Each edge directly connecting a pair of nodes is assigned a "Strength of Relationship" (SOR) weight based on the quality and frequency of contact between the two people (not illustrated). The relationship graph 100, along with the SOR between pairs of nodes, establishes a "Network Strength of Relationship" (NSOR) between every reachable pair of nodes in the social network represented by the graph 100, and an "Aggregate Strength of Relationship" (ASOR) between either subscribers to the system, or groups of subscribers, and targets who are subscribers or non-subscribers known to subscribers ("leaves"), or groups of subscribers and/or leaves.

As illustrated, even though Pete and Mary are not directly connected, Pete can "reach" Mary by being referred through the social network represented by the graph 100. Starting with Pete's immediate relationships, the system of the present invention analyzes the relationship graph 100 to dynamically establish a path of intermediate nodes 105, 107, 109 that ends with the node 103, and suggests Tim as Pete's starting contact for his referral request. Pete invokes a workflow function within the system to begin the process of forwarding his referral request to Mary. The system will send a message to Tim, informing him that Pete is requesting a referral to Mary and that Pierre is the next contact in the referral path. If Tim decides to forward the referral request to Pierre, Pierre will receive a similar message indicating that John is the next contact. In an alternate embodiment, any person receiving the referral request may determine that a person different than that originally selected by the system should be the next link in the path. Furthermore, although only one path is illustrated in FIG. 1A, it will be appreciated that the system may rank multiple paths based on various relationship criteria, including SOR value. In one embodiment, the relationship criteria include common affiliations, such as alma maters, shared between people. It also will be appreciated that additional weights may be calculated for each edge and factored into the path calculation; some exemplary weights are described further below.

Figure 1B:
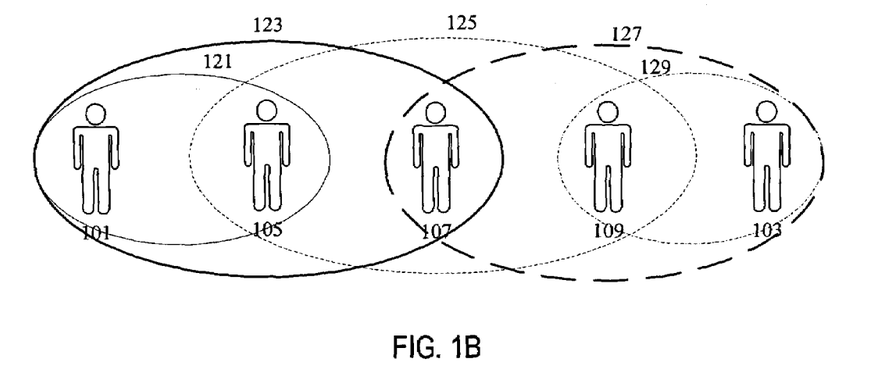
FIG. 1B is a diagram illustrating a privacy feature of the embodiment of FIG. 1A.

Any person in the path may decline to forward the request to the next person, but a privacy protection scheme for the workflow masks the break in the referral chain so that the request originator only knows that the referral request was not successful, not where the chain was broken. The privacy protection scheme is illustrated in FIG. 1B as a series of visibility windows, 121, 123, 125, 127, 129, that block the identities of people in the path outside the immediate scope of the current node who are neither the request originator nor destination. Thus, the visibility window 121 covers Pete 101 and Tim 105, but not Tim's contact Pierre 107. The visibility window 123 allows Tim 105 to see both Pete 101 and Pierre 107, but not Pierre's contact John 109. Similarly, Pierre 107 sees Tim 105 and John 109 through visibility window 125, and John 109 sees Pierre 107 and Mary 103 through visibility window 127. As illustrated, Mary 103 only sees John 109 through visibility window 129. Although not illustrated in FIG. 1B, each visibility window includes the identity of Pete 101 as the originator of the referral and Mary 103 as the destination. In an alternate embodiment, each contact in the chain can elect to hide the identity of the originator of the request. The system may also include a referral proxy function that allows a subscriber to have his/her identity masked when they are the next contact in a path and the previous contact was a particular individual. For example, in a professional services firm, all partners are required to help each other but inter-personal dynamics lead to a situation where one partner may prefer to help another under only certain circumstances.

Assuming someone in the path does decline to forward the request, the system may use that information to recalculate the SOR between the sender of the request and the person that broke the chain. Conversely, if node N passes on the referral it receives from node N-1, the SOR between nodes N-1 and N increases.

In one embodiment, the system maintains three categories of data about people: public data, private data, and "inferred" data. Public data is information that is generally available, such as on the Internet, or is specifically made available to all subscribers to the system. For example, name, title, and employer fall in the public data category. When a change in public data is extracted from a sufficient number of data sources, the public data is updated if the change is considered "correct" as described further below. Private data is information that every subscriber individually maintains for the other people with which he/she has direct relationships. Thus, A's private data may reflect a change in the mobile telephone number for B while C continues to see only the old number. Inferred data is information developed by the system based on interactions among the subscribers. Thus, in the above example, the system may infer that B has changed jobs based on A's private data. In one embodiment, inferred data is protected with additional security, such as encryption, to safeguard the personal actions of the subscribers.

As previously described, the relationship graph 100 illustrated in FIG. 1A is established based on direct communications among people. However, a new subscriber may not have supplied sufficient information to the system to enable the system to establish a referral path. In an embodiment not illustrated, subscribers may be members of public or private groups, and the system searches through the contacts of the group when establishing a path for a group member. Public groups are open to anyone; joining a private group requires permission from a group manager, typically the creator of the group.

Furthermore, in one embodiment, the system distinguishes among subscribers to the system and those non-subscribers with whom the subscribers communicate to protect the privacy of the non-subscribers. For example, assume non-subscriber A sends email to subscriber B and carbon copies fifteen other people. A has thus exposed the fifteen other people to B and the system adds the fifteen people to B's relationship graph as "shadow" nodes, which it includes in its search when B requests a referral path. Additionally, A is added as a "shadow" subscriber. However, because A is a shadow subscriber, no subscribers other than B can search through A and any workflow that identifies B as an intermediary link to one of the fifteen ends at B. If B decides to forward the referral request, B contacts A outside the system.

While the system has been described in terms of relationships between pairs of nodes, it will be appreciated that nodes may be grouped into sets and that relationships may be established among nodes and sets of nodes in various combinations and processed in a similar fashion to relationships among individual nodes.

Figure 2:
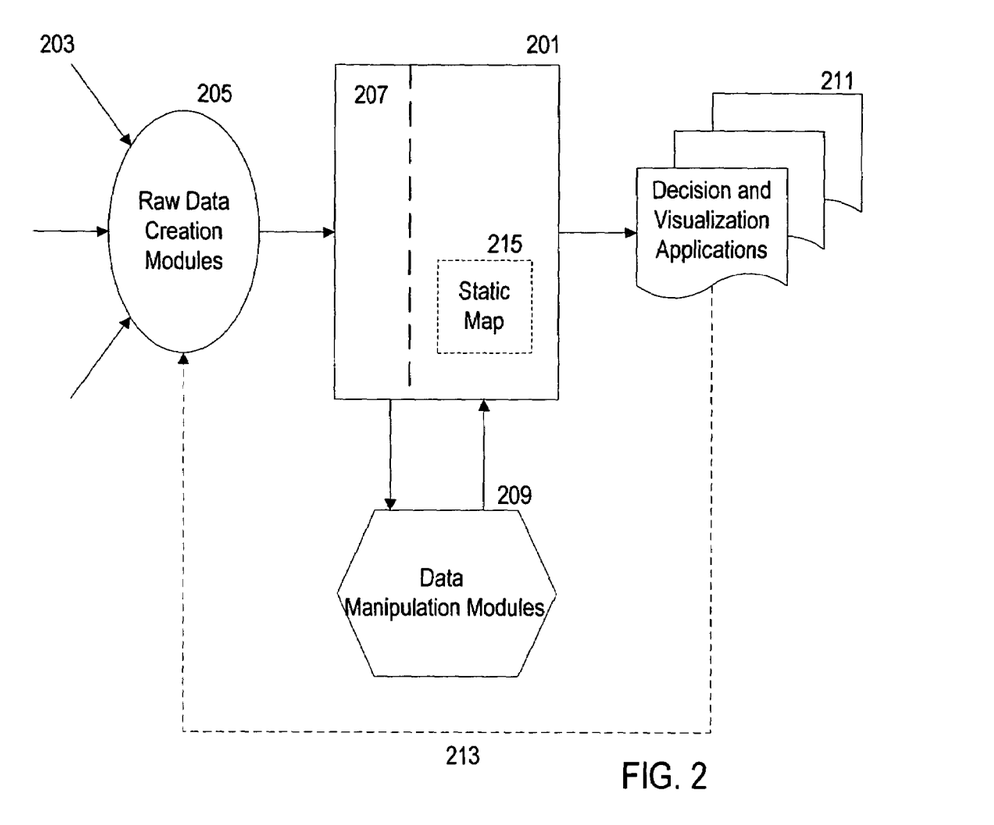
FIG. 2 is a diagram illustrating an overview of data flow and processing modules of an embodiment of the invention.

FIG. 2 illustrates one embodiment of logical data flows and modules that build, maintain, and use a global relationship graph, such as graph 100 in FIG. 1A. Raw data is extracted from data sources 203 by modules 205. The raw data is stored in a local area 207 in a relationship graph data store 201 for subsequent manipulation by modules 209 into a global relationship graph. It will be appreciated that data sources 203 may be any resource that contains relationship information for people or entities that affect the global relationship graph. Instances, referred to herein as "maps," of the global relationship graph may be created to represent all or portions of the global relationship graph and may present the relationship data in different formats. As illustrated in FIG. 2, static map 215 is built from the global relationship graph and used by decision and visualization applications 211, such as, for example, to establish a referral path. Results from the applications 211 may be fed back, as illustrated by arrow 213, into the relationship graph data store 201 to update the global relationship graph. Thus, the global relationship graph is dynamic and reflects information "learned" from the operations of applications 211.

As will be discussed in more detail below, the applications 211 may also control periodic update of data associated with the global relationship graph. In particular, the applications 211 may ask subscribers to contribute pieces of data for existing entities of the relationship graph and then update the contents of the relationship graph data store 201 based on the data provided by the subscribers. The data may be desired to cover gaps in information about existing entities and their relationships, to validate or confirm information about existing entities and their relationships, to resolve conflicting information about existing entities and their relationships, to find alternate sources of information, to eliminate or consolidate duplicate entities, etc.

Figure 3:
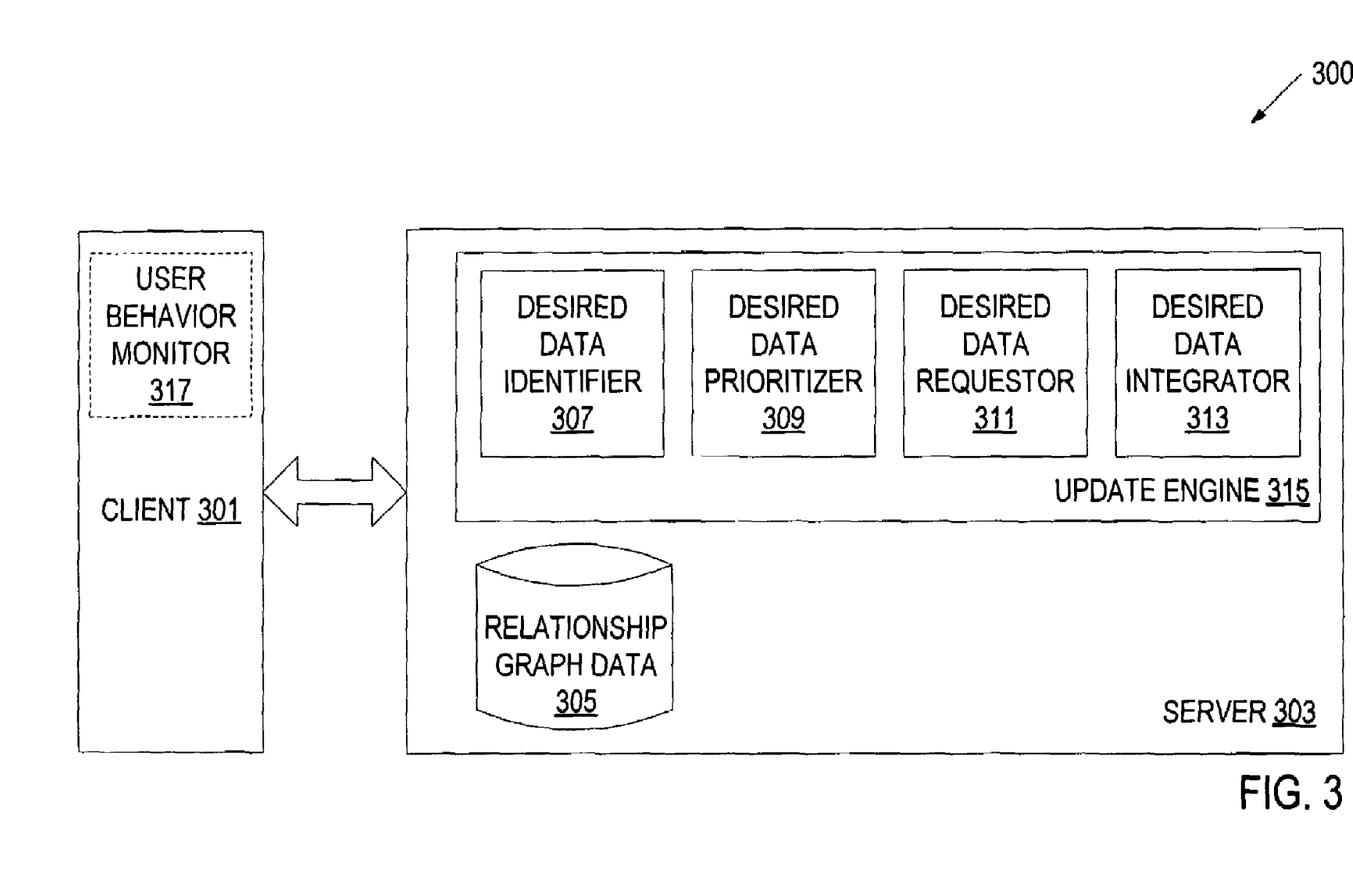
FIG. 3 is a block diagram illustrating a system architecture for an embodiment of the invention.

FIG. 3 is a block diagram of one embodiment of a system 300 for updating data concerning elements of a relationship graph. As discussed above, the elements of a relationship graph include entities (e.g., individuals, organizations of people, collections of characteristics shared by people, etc.) and relationships between the entities.

The system 300 includes a client 301 (or clients) for each individual subscriber to the system 300 and a server 303 that manages the global relationship graph. The client 301 includes a user behavior monitor 317 that will be discussed in more detail below. The server 303 includes a relationship graph data store 305 and an update engine 315 that may be part of decision and visualization applications 211 of FIG. 2. The relationship graph data store 305 may store data of a single relationship graph or multiple relationship graphs. The update engine 315 is responsible for updating the content of the relationship graph data store 305.

In one embodiment, the update engine 315 includes a desired data identifier 307, a desired data prioritizer 309, a desired data requestor 311, and a desired data integrator 313. The desired data identifier 307 is responsible for identifying a set of desired data that would be beneficial to obtain in order to provide more complete and accurate information to the subscribers. The set of desired data is identified by analyzing the relationship graph data 305 and may include missing information about existing entities and their relationships, validation or confirmation of information about existing entities and their relationships, resolution of conflicting information about existing entities and their relationships, alternate sources of information, elimination or consolidation of duplicate entities, etc.

The desired data prioritizer 309 is responsible for prioritizing pieces of the desired data based on their importance to the subscribers. In one embodiment, the importance of the desired data to the subscribers is determined by the desired data prioritizer 309, which monitors information requests (e.g., search queries, referral requests, etc.) submitted by the subscribers to the server 303 and analyzes their content to identify pieces of the desired data that are important to the subscribers. In another embodiment, the desired data prioritizer 309 cooperates with user behavior monitors 317 residing on corresponding clients 301 to determine the importance of the desired data. In particular, each user behavior monitor 317 performs a set of monitoring operations to identify entities that are of interest to the subscriber and sends information identifying the entities of interest to the server 303. The set of monitoring operations may include, for example, monitoring search queries submitted by the subscriber over the Internet (e.g., using a browser plug-in application residing on the client 301), searching local files for new accounts created by the subscriber, scanning email messages of the subscriber to find requests for referrals, etc. The desired data prioritizer 309 receives information identifying entities of interest from multiple clients 301 and uses this information to determine which pieces of the desired data are important to the subscribers.

The desired data requestor 311 is responsible for finding one or more information suppliers for each important piece of desired data and communicating a request for this important piece of the desired data to the information suppliers. In one embodiment, the desired data requester 311 finds the information suppliers by identifying entities that are likely to have knowledge of a relevant piece of the desired data based on the relationship graph data 305 and then determining which of those entities are likely to provide the relevant piece of the desired data (e.g., based on subscribers' survey preferences). In one embodiment, the desired data requestor 311 is also responsible for selecting an optimal communication channel for communicating a request for desired data to the information suppliers. Potential communication channels may include, for example, an email message, a message in a pop-up window, inline text in a commonly viewed web page, etc.

The desired data integrator 313 is responsible for receiving requested data from information suppliers, processing it and integrating into the relationship graph data 305.

Figure 4:
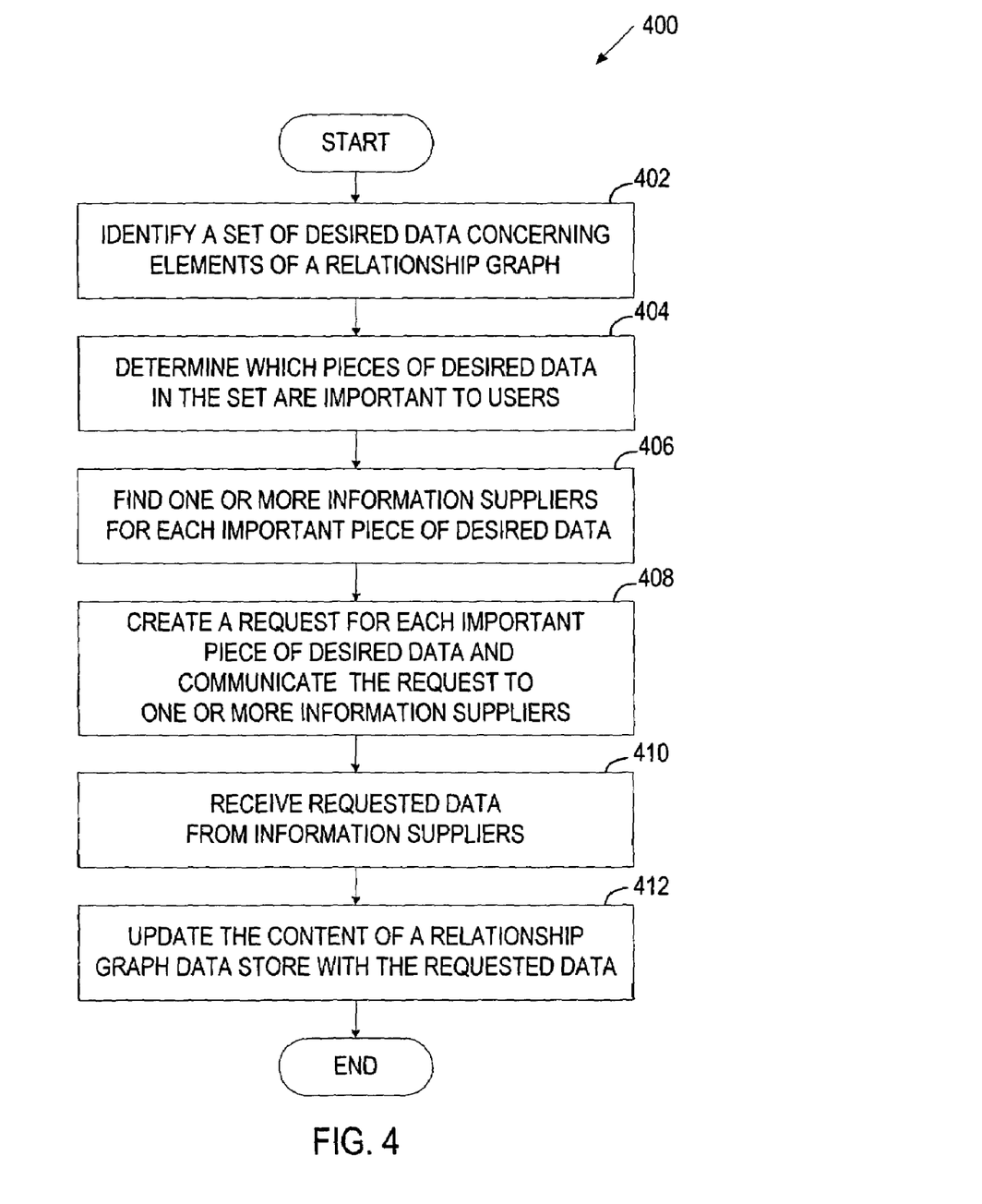
FIGS. 4-7 are flow diagrams of methods to be performed by a server according to an embodiment of the invention.

FIG. 4 is a flow diagram of one embodiment of a method 400 for updating data concerning elements of a relationship graph. Method 400 may be performed by processing logic, which resides on a server (e.g., server 303 of FIG. 3) and may comprise hardware, software, or a combination of both.

Referring to FIG. 4, method 400 begins with processing logic identifying a set of desired data concerning elements of a relationship graph (i.e., entities and their relationships) (block 402). As discussed above, the set of desired data may include missing information about existing entities and their relationships, validation or confirmation of information about existing entities and their relationships, resolution of conflicting information about existing entities and their relationships, alternate sources of information, elimination or consolidation of duplicate entities, etc.

At block 404, processing logic determines which pieces of desired data in the set are important to users. In one embodiment, this determination is made by monitoring the behavior of subscribers within the system (e.g., monitoring subscribers' search queries and requests for referrals within the system, monitoring data being viewed by subscribers within the system, etc.). In another embodiment, the determination as to which desired data is important to the users is made based on information received from corresponding client devices. That is, processing logic collects information from local applications (residing on corresponding client devices) that determine which entities may be of interest to their users. One embodiment of a method for determining the importance of desired data to users is discussed in greater detail below in conjunction with FIG. 5.

At block 406, processing logic finds one or more information suppliers for each important piece of desired data. In one embodiment, processing logic finds the information suppliers by analyzing the relationship graph to determine which entities are likely to have knowledge of a relevant piece of desired data and then selecting the entities that are likely to provide the relevant piece of desired data. One embodiment of a method for finding information suppliers for important pieces of desired data is discussed in more detail below in conjunction with FIG. 6.

At block 408, processing logic creates a request for each important piece of desired data and communicates this request to one or more information suppliers. In one embodiment, processing logic communicates each request for important piece of desired data via an optimal communication channel. Examples of an optimal communication channel may include an email message, a message in a pop-up window, inline text in a commonly viewed web page, etc. Processing logic may consider various factors when selecting an optimal communication channel. These factors may include, for example, the type of the request required (e.g., "yes/no" versus "fill in the blank"), historical data identifying communication channels that received good response from the information supplier in the past, the urgency of the request, etc. One embodiment of a method for communicating requests for desired data to information suppliers will be discussed in greater detail below in conjunction with FIG. 7.

Further, processing logic receives the requested data from the information supplier (block 410) and updates the content of a relationship graph data store with the requested data (block 410). In one embodiment, if the requested data represents an update to an existing contact for an entity, processing logic updates the data for the corresponding node and recalculates the strength of relationship SOR(s) for the relationships in which the contact participates. If the requested data represents a new contact, processing logic adds a new node for the contact, calculates the SOR(s) for all relationships for the new node and creates edges for the relationships for the new node. If the data was requested to resolve conflicting information associated with one or more entities, processing logic reconciles this conflict based on the requested data and updates data of all involved entities accordingly. If the data was requested to address duplicate entities in the relationship graph, processing logic eliminates a duplicate entity or consolidates duplicate entities based on the requested data.

Figure 5:
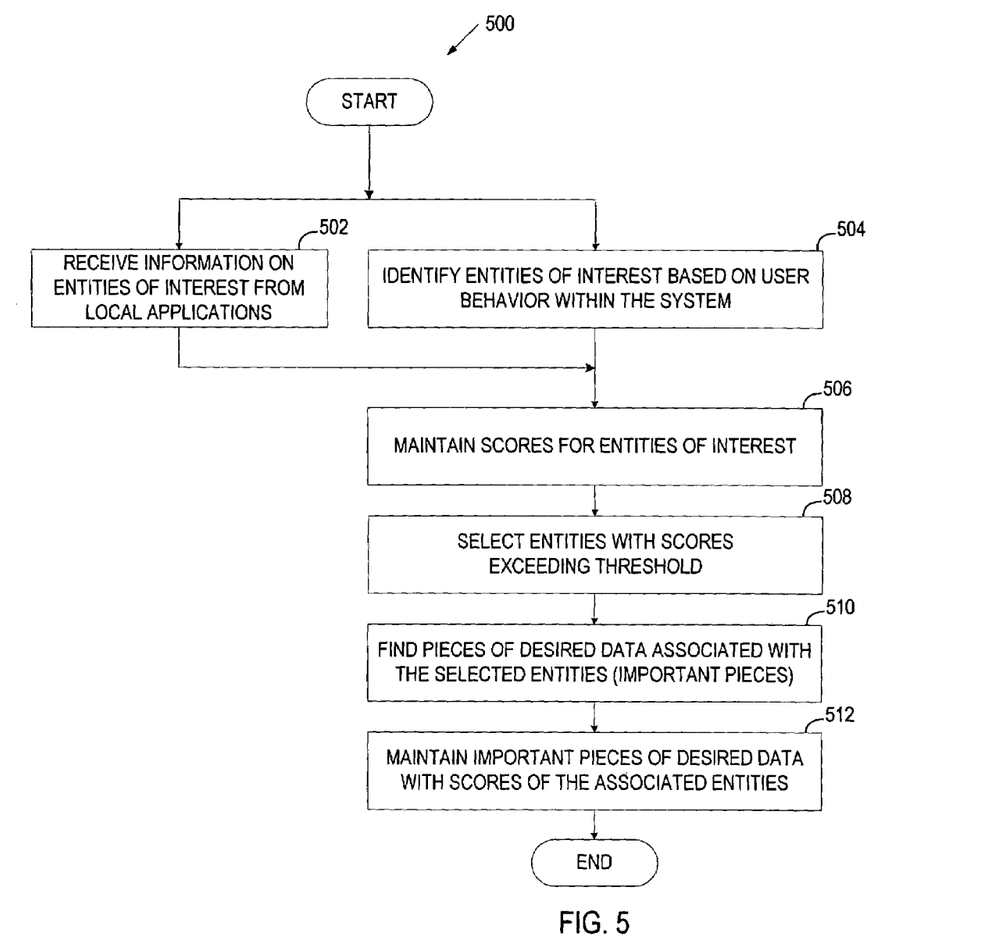

FIG. 5 is a flow diagram of one embodiment of a method 500 for determining the importance of desired data to users. Method 500 may be performed by processing logic, which may comprise hardware, software, or a combination of both.

Referring to FIG. 5, method 500 begins with processing logic receiving information on entities of interest to subscribers from local applications (block 502). As discussed above, local applications may identify entities of interest (e.g., people, organizations, companies, industries, sectors, etc.) by performing a set of monitoring operations that may include, for example, analyzing search queries submitted by the subscribers over the Internet, searching local files for new accounts created by the subscribers, scanning email messages of the subscribers to find requests for referrals, etc.

At block 504, processing logic identifies entities (e.g., people, organizations, companies, industries, sectors, etc.) that are of interest to the subscribers based on the subscribers' behavior within the system. In one embodiment, processing logic determines the subscribers' behavior by monitoring search queries and requests for referrals submitted by the subscribers within the system and monitoring data viewed by the subscribers within the system. In another embodiment, processing logic determines the subscribers' behavior by monitoring changes to the relationship graph. For example, processing logic may detect an addition of new entities to the relationship graph, determine that the new entities belong to a certain organization, and analyze information about this organization to predict which existing entities may be of interest to the new entities.

For each identified entity of interest, processing logic maintains a score (block 506). The score may depend on the number of subscribers being interested in the relevant entity, the extent of the interest demonstrated by each of these subscribers (e.g., the number of search queries submitted by a subscriber for a specific entity), and/or a demonstrated urgency of requests for information concerning the entities of interest.

Next, processing logic selects entities that have scores exceeding a threshold score (block 508) and links the selected entities to corresponding pieces of desired data (block 508). These pieces of desired data are considered to be important to the subscribers because they pertain to the entities for which the subscribers demonstrated a significant interest.

At block 512, processing logic associates each important piece of desired data with the score of a corresponding entity. In one embodiment, processing logic creates several groups of important pieces of desired data based on their scores (e.g., a high-priority group, a medium-priority group and a low-priority group). In one embodiment, processing logic also determines the type of each important piece of desired data (e.g., whether it is job-related information or personal information) and adds the type of information to the score.

Figure 6:
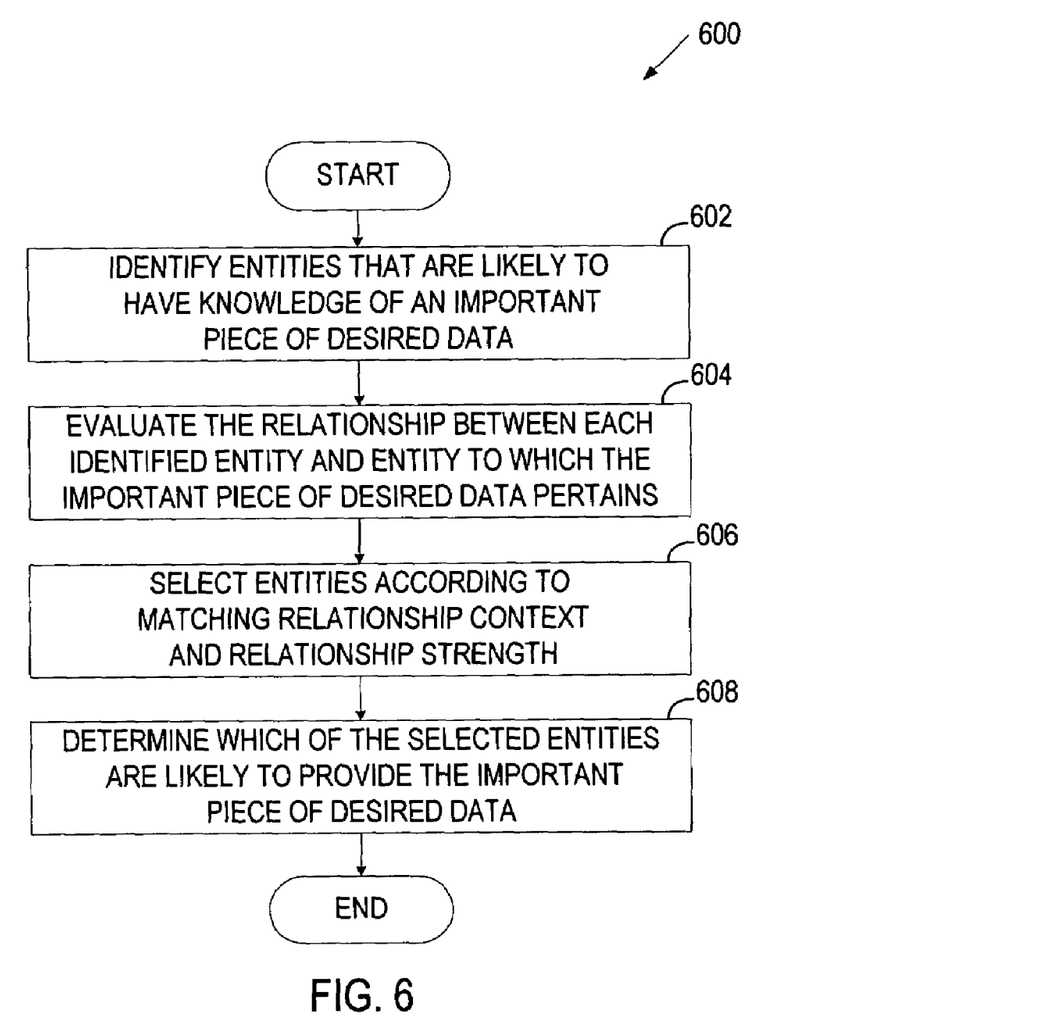

FIG. 6 is a flow diagram of one embodiment of a method 600 for finding information suppliers for important pieces of desired data. Method 600 may be performed by processing logic, which may comprise hardware, software, or a combination of both.

Referring to FIG. 6, method 600 begins with processing logic analyzing the relationship graph to identify, for each important piece of desired data, entities that are likely to have knowledge of a relevant piece of desired data (block 602). That is, processing logic may find entities that have relationships with an entity to which a relevant piece of desired data pertains by analyzing the relationship graph. In one embodiment, processing logic also finds people who are not subscribers (and thus are not represented as entities in the relationship graph) but who have relationships with subscribers and are somehow connected to the entity to which the relevant piece of desired data pertains. For example, if non-subscriber A often includes subscribers B and C on the same messages, processing logic may choose A as an information supplier for data about C rather than choosing B. The option of going outside the subscriber pool greatly expands the number of potential information suppliers, thus providing wider knowledge coverage while reducing the load on the subscribers.

At block 604, processing logic evaluates the relationship between each identified entity and the entity to which a relevant piece of desired data pertains. In one embodiment, processing logic collects data regarding relationship context and relationship strength for each edge in the relationship graph and uses this data when evaluating the relationships. The relationship context defines whether this relationship is personal, job-related, or of any other type. The relationship strength is based on how often the entities communicate, how recently they have communicated, how responsive they have been to each other's referral requests, whether an identified entity has shown interest in the entity for which information is needed or recently did research about this entity, how reliable the information provided by the identified entity for the entity of interest has been in the past, etc.

At block 606, processing logic selects entities according to matching relationship context and relationship strength. For example, based on the score of the relevant piece of desired data, processing logic may look for stronger or weaker relationship, or based on the type of the relevant piece of desired data, processing logic may look for a specific context of the relationship. For example, if the required piece of data is job-related, processing logic may seek out a professional relationship rather than a personal one.

At block 608, processing logic determines which of the selected entities are likely to provide the important piece of desired data. Processing logic makes this determination based on different factors, e.g., current preferences of a selected entity with respect requests for information, whether the selected entity has been willing to provide information in the past, whether the selected entity is suffering from survey fatigue, etc.

Afterwards, processing logic compiles for each important piece of desired data a list of information suppliers that consists of entities that were selected at block 606 and also satisfied the requirement of block 608.

Figure 7:
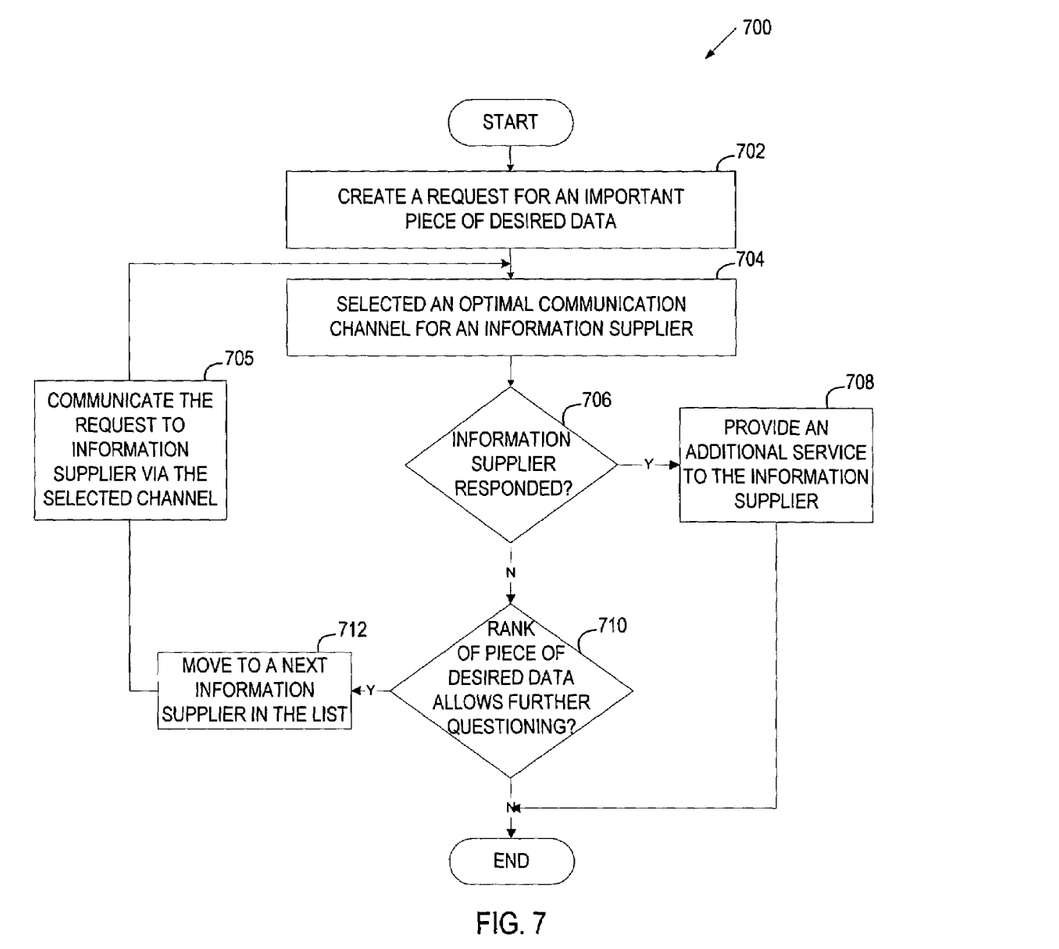

FIG. 7 is a flow diagram of one embodiment of a method 700 for communicating a request for desired data to information suppliers. Method 700 may be performed by processing logic, which may comprise hardware, software, or a combination of both.

Referring to FIG. 7, method 700 begins with processing logic creating a request for relevant piece of desired data (block 702). Next, processing logic selects a first information supplier in a list of information suppliers created (e.g., by method 600) for the relevant piece of desired data and selects an optimal channel for communicating the request to this information supplier (block 704).

Potential communication channels may include, for example, a direct message (e.g., email) to the information supplier, a message in a popup window, inline text on a commonly viewed web page (e.g., the dashboard), inline prompts at a critical juncture of a workflow (e.g. referral), interaction with the installed client software, etc. A direct email may be from the system or another subscriber on the system if that subscriber has authorized and pre-approved the system sending messages on his or her behalf. Processing logic selects an optimal communication channel based on various factors, e.g., the type of response required (e.g. "yes/no" versus "fill in the blank"), historical data about what the information supplier has responded to best in the past, etc. For example, if a subscriber always closes popup windows, processing logic may not select that option as its means of requesting information from that subscriber. The selection may not always include the full set of options. For example, some information suppliers may not be subscribers or may not have required software installed. Another factor affecting the selection of the optimal communication channel may pertain to the urgency of the request. For example, if immediate input is required, processing logic may utilize a less subtle communication channel in order to ensure that the information supplier notices the request as soon as possible. Alternatively, processing logic may choose a less blatant communication channel for a less urgent request in order to avoid annoying the information supplier.

At block 705, processing logic communicates the request to the information supplier via the selected communication channel. In one embodiment, before communicating the request, processing logic determines an optimal timing and frequency for the request. For example, processing logic may determine when the information supplier tends to be most active or busiest during the day based on his email traffic patterns, interaction with software, scheduled meetings, etc. Processing logic may also decide how often to request the same piece of information from a single individual and at which stage (e.g., randomly, upon login, after a search, during a referral, etc.).

At block 706, processing logic determines whether the information supplier has responded. If not, processing logic further determines whether the score of the relevant piece of desired data is high enough to qualify for further questioning regarding this piece of desired data (block 710). If not, method 700 ends. If so, processing logic moves to the next information supplier in the list (block 712) and processing logic proceeds to block 704.

In one embodiment, if the information supplier has responded to the request, processing logic provides an additional service to the information supplier as a reward (block 708). For example, processing logic may use the information received from the information supplier to clean data of the information supplier (e.g., if the information supplier enters a title for one of his or her contacts, processing logic adds this title to the address book of the information supplier or any other appropriate document of the information supplier). In addition, processing logic may allow the information supplier to provide a hint on information that he or she would find valuable and then issue intelligent requests for that data on the behalf of the information supplier.

As discussed above, upon receiving requested data, processing logic can eliminate duplicate entities and consolidate contacts into unique persons. As a result, multiple individuals who know the same person can contribute partial information, which is then aggregated into a complete view of the person. Further, the public information can be shared across subscribers, providing widespread benefit with relatively little individual contribution. Moreover, because of integration of information from different sources, all of which may have a different view (potentially from a different time period or context) of the person or organization in question, it becomes possible to compile a fuller set of information than if a single source of data were used.

In practice, the methods described herein may constitute one or more programs made up of machine-executable instructions. Describing the method with reference to the flowcharts in FIGS. 4-7 enables one skilled in the art to develop such programs, including such instructions to carry out the operations (acts) represented by the logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated herein without departing from the scope of the invention and that no particular order is implied by the arrangement of blocks shown and described herein. Moreover, one of skill in the art will immediately recognize that the various processes described with reference to FIGS. 4-7 may be performed in a batch mode as well as in an interactive mode, or in parallel as well as in serial processes.

Figure 8A:
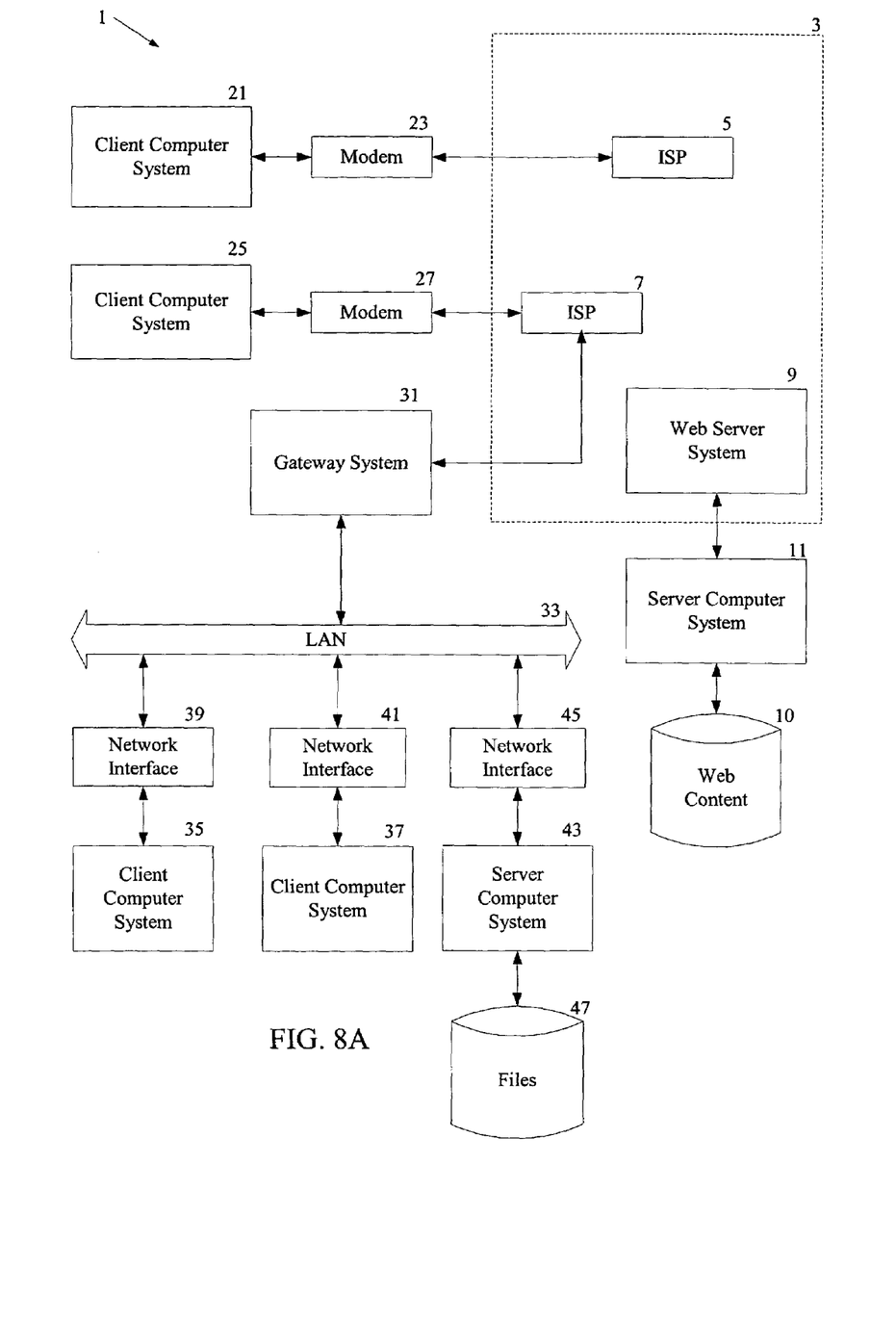
FIG. 8A is a diagram of one embodiment of an operating environment suitable for practicing the present invention.
Figure 8B:
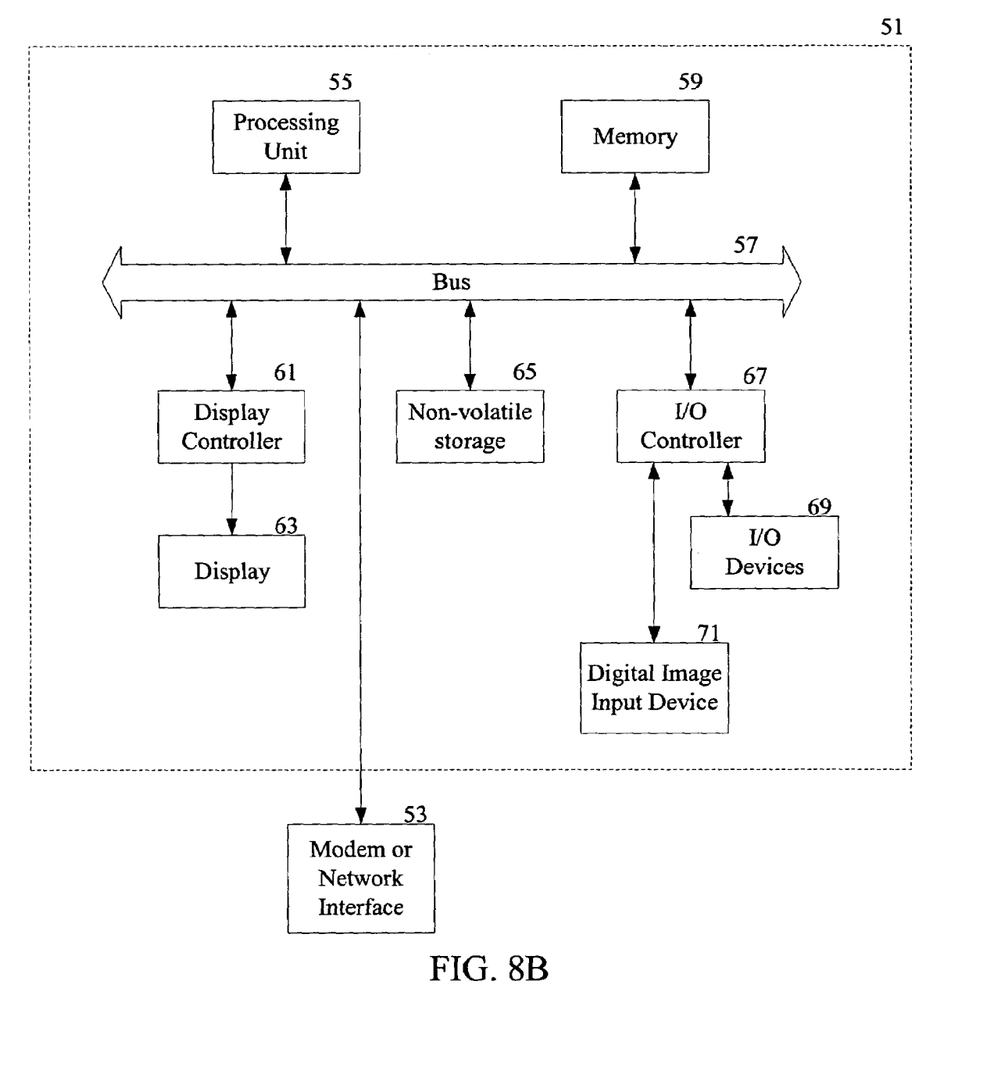
FIG. 8B is a diagram of one embodiment of a computer system suitable for use in the operating environment of FIG. 8A.

The following description of FIGS. 8A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 8A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 8A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld device, or other such computer system. Similarly, the ISP 7 provides Internet connectivity for client systems 25, 35, and 37, although as shown in FIG. 8A, the connections are not the same for these three computer systems. Client computer system 25 is coupled through a modem interface 27 while client computer systems 35 and 37 are part of a LAN. While FIG. 8A shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 8B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 8B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

A method and system for periodically updating data in a relationship system have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that although the system has been described in terms of sales prospecting and lead generation, the invention is not so limited and is suitable for use in any environment that utilizes referrals from one person to another. Furthermore, those of ordinary skill within the art will appreciate the term "database" has been used in its generic sense and is intended to encompasses all types of logical data storage, including relational, hierarchical, indexed and flat file systems. Therefore, it is manifestly intended that this invention be limited only by the following claims and equivalents thereof.

What is claimed is:

1. A computerized method of updating a relationship graph, comprising:
   identifying a set of desired data concerning elements of a relationship graph, the elements of the relationship graph including nodes representing entities and edges representing relationships between the entities, wherein the set of desired data includes data currently unavailable from the relationship graph;
   determining which pieces of desired data in the set are important to users;
   finding, without user input, one or more information suppliers for each important piece of desired data, wherein at least one information supplier is a user represented by a node in the relationship graph;
   communicating, without user input, a request for said important piece of desired data to the one or more information suppliers, the request prompting the one or more information suppliers to input said important piece of desired data; and
   updating the relationship graph based on input provided by the one or more information suppliers.

2. The computerized method of claim 1 further comprising: selecting an optimal channel from a plurality of available communication channels to communicate the request, wherein the plurality of available communication channels include at least one of an email message, a popup window, or a web page;
   receiving requested data from the one or more information suppliers;
   processing the requested data; and
   storing the requested data in a relationship graph data store.

3. The computerized method of claim 2 wherein selecting the optimal channel to communicate the request comprises:
   determining a type of a required response; and
   evaluating historical information pertaining to previous responses of each of the one or more information suppliers.

4. The computerized method of claim 1 wherein communicating the request for each important piece of desired data to the one or more information suppliers comprises:
   creating a list consisting of the one or more information suppliers;
   posing the request to a first information supplier in the list;
   determining that the first information supplier is unwilling to provide requested data; and
   posing the request to a next information supplier in the list.

5. The computerized method of claim 1 wherein the set of desired data comprises data selected from the group consisting of missing data for one or more of the elements of the relationship graph, data to validate information concerning one or more of the elements, data to resolve conflicting information concerning one or more of the elements, and data to eliminate duplication of one or more of the elements in the relationship graph.

6. The computerized method of claim 1 wherein determining which pieces of desired data in the set are important to users comprises:
analyzing search queries of the users to identify entities to which the search queries pertain.

7. The computerized method of claim 1 wherein determining which pieces of desired data in the set are important to users comprises:
detecting new accounts created by the users; and
identifying entities associated with the new accounts.

8. The computerized method of claim 1 wherein determining which pieces of desired data in the set are important to users comprises:
analyzing communications of the users to detect referral requests; and
identifying entities to which the referral requests pertain.

9. The computerized method of claim 1 wherein determining which pieces of desired data in the set are important to users comprises:
detecting that new entities are added to the relationship graph, the new entities being affiliated with an organization; and
analyzing information about the organization to predict data that may be of interest to the new entities.

10. The computerized method of claim 1 wherein finding one or more information suppliers for each important piece of desired data comprises:
identifying entities of the relationship graph that are likely to have knowledge about a corresponding important piece of the desired data;
evaluating a relationship between each of the identified entities and an entity to which the corresponding important piece of data pertains; and
determining whether each of the identified entities is likely to provide a corresponding important piece of the desired data.

11. The computerized method of claim 10 wherein determining whether each of the identified entities is likely to provide a corresponding important piece of the desired data comprises:
evaluating survey preferences of each of the identified entities; and
determining whether each of the identified entities is likely to suffer from survey fatigue.

12. The computerized method of claim 1 further comprising:
providing incentives for the one or more information suppliers to respond to the request.

13. The computerized method of claim 12 wherein providing incentives for the one or more information suppliers to respond to the request comprises:
updating personal data of each of the one or more information supplier with data received from other information suppliers; and
creating requests for information important to the one or more information suppliers.

14. The method of claim 1, wherein at least one information supplier is an entity not represented by a node in the relationship graph.

15. The method of claim 1, further comprising:
prioritizing the pieces of desired data based on at least one of information requests and a behavior monitor.

16. A machine-readable storage medium having executable instructions to cause a machine to perform a method comprising:
identifying a set of desired data concerning elements of a relationship graph, the elements of the relationship graph including nodes representing entities and edges representing relationships between the entities, wherein the set of desired data includes data currently unavailable from the relationship graph;
determining which pieces of desired data in the set are important to users;
finding, without user input, one or more information suppliers for each important piece of desired data, wherein at least one information supplier is a user represented by a node in the relationship graph;
communicating, without user input, a request for said important piece of desired data to the one or more information suppliers the request prompting the one or more information suppliers to input said important piece of desired data;
selecting an optimal channel from a plurality of available communication channels to communicate the request, wherein the plurality of available communication channels include at least one of an email message, a popup window, or a web page; and
receiving requested data from the one or more information suppliers.

17. The machine-readable storage medium of claim 16 wherein the method further comprises:
processing the requested data; and
storing the requested data in a relationship graph data store.

18. The machine-readable storage medium of claim 16 wherein the set of desired data comprises data selected from the group consisting of missing data for one or more of the elements of the relationship graph, data to validate information concerning one or more of the elements, data to resolve conflicting information concerning one or more of the elements, and data to eliminate duplication of one or more of the elements in the relationship graph.

19. The machine-readable storage medium of claim 16 wherein determining which pieces of desired data in the set are important to users comprises:
analyzing search queries of the users to identify entities to which the search queries pertain;
detecting new accounts created by the users to identify entities associated with the new accounts;
analyzing communications of the users to detect referral requests to identify entities to which the referral requests pertain;
detecting that new entities affiliated with an organization are added to the relationship graph; and
analyzing information about the organization to predict data that may be of interest to the new entities.

20. The machine-readable storage medium of claim 16 wherein finding one or more information suppliers for each important piece of desired data comprises:
identifying entities of the relationship graph that are likely to have knowledge about a corresponding important piece of the desired data;
evaluating a relationship between each of the identified entities and an entity to which the corresponding important piece of data pertains; and
determining whether each of the identified entities is likely to provide a corresponding important piece of the desired data.

21. The machine-readable medium of claim 16, wherein at least one information supplier is an entity not represented by a node in the relationship graph.

22. The machine-readable medium of claim 16, the method further comprising:
prioritizing the pieces of desired data based on at least one of information requests and a behavior monitor.

23. An apparatus comprising:
a desired data identifier to identify a set of desired data concerning elements of a relationship graph, the elements of the relationship graph including nodes representing entities and edges representing relationships between the entities, wherein the set of desired data includes data currently unavailable from the relationship graph;
a desired data prioritizer to determine which pieces of desired data in the set are important to users; and
a desired data requestor to find one or more information suppliers for each important piece of desired data without user input, to communicate a request for said important piece of desired data to the one or more information suppliers without user input, the request prompting the one or more information suppliers to input said important piece of desired data, and to select an optimal channel from a plurality of available communication channels to communicate the request, wherein at least one information supplier is a user represented by a node in the relationship graph, and wherein the plurality of available communication channels include at least one of an email message, a popup window, or a web page.

24. The apparatus of claim 23 further comprising a desired data integrator to receive requested data from the one or more information suppliers, to process the requested data, and to store the requested data in a relationship graph data store.

25. The apparatus of claim 23, wherein at least one information supplier is an entity not represented by a node in the relationship graph.

26. The apparatus of claim 23, wherein the desired data prioritizer is configured to prioritize the pieces of desired data based on at least one of information requests and a behavior monitor.

27. An apparatus comprising:
means for identifying a set of desired data concerning elements of a relationship graph, the elements of the relationship graph including nodes representing entities and edges representing relationships between the entities, wherein the set of desired data includes data currently unavailable from the relationship graph;
means for determining which pieces of desired data in the set are important to users;
means for finding, without user input, one or more information suppliers for each important piece of desired data, wherein at least one information supplier is a user represented by a node in the relationship graph;
means for communicating, without user input, a request for said important piece of desired data to the one or more information suppliers, the request prompting the one or more information suppliers to input said important piece of desired data;
means for selecting an optimal channel to communicate the request; and
means for receiving requested data from the one or more information suppliers.

28. The apparatus of claim 27 further comprising:
means for processing the requested data; and
means for storing the requested data in a relationship graph data store.

29. A system comprising:
a processor coupled to a memory through a bus, and further coupled to an I/O interface through the bus; and
an update process executed from the memory by the processor to cause the processor to identify set of desired data concerning elements of a relationship graph, the elements of the relationship graph including nodes representing entities and edges representing relationships between the entities, wherein the set of desired data includes data currently unavailable from the relationship graph, to determine which pieces of desired data in the set are important to users, to find one or more information suppliers for each important piece of desired data without user input, wherein at least one information supplier is a user represented by a node in the relationship graph, and to communicate a request for said important piece of desired data to the one or more information suppliers without user input, the request prompting the one or more information suppliers to input said important piece of desired data.

30. The system of claim 29 wherein the update process is further to select an optimal channel to communicate the request, to receive requested data from the one or more information suppliers, to process the requested data, and to store the requested data in a relationship graph data store.

* * * * *